Patented Nov. 5, 1940

2,220,396

UNITED STATES PATENT OFFICE 2,220,396

METALLIZED ACID POLYAZO DYES

Moses L. Crossley, Plainfield, and Lincoln M. Shafer, Upper Montclair, N. J., assignors to American Cyanamid Company, New York, N. Y., a corporation of Maine No Drawing. Application October 31, 1939, Serial No. 302,153

13 Claims. (Cl. 260—145)

This invention relates to metallized polyazo dyes which show excellent fastness to light and more particularly, to polyazo dyes metallized with the non-alkaline salt forming metals of the second group of the periodic table of elements, especially cadmium, zinc and mercury.

This invention is in part a continuation of our copending application Serial No. 150,540 filed June 26, 1937.

The metallized dyes of the present invention are obtained by metallizing a polyazo dye having a middle component which is a dihydroxy aryl compound capable of combining with two molecules of diazo compounds in positions ortho the hydroxy groups, at least one of the diazo compounds having a metallizable group such as a hydroxyl or carboxyl group ortho to the azo group and at least one end component containing a solubilizing group. The dyes may be represented by the following general structural formula:

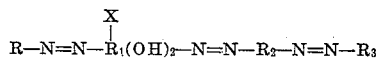

in which R, R₁, R₂ and R₃ are aryl radicals, the two hydroxyl groups on R₁ are ortho to the azo groups, X represents groups such as halogen, alkyl, alkoxy, nitro, carboxyl, sulfonic, hydroxyl and hydrogen. At least one of the radicals R and R₂ has a metallizable group ortho to the azo group connecting the radical to R₁ and at least one of the radicals R and R₃ has a solubilizing group.

In carrying out the present invention, the polyazo dyes are metallized with one or more non-alkaline salt forming metals of the second group of the periodic table of elements such as cadmium, zinc and mercury or combinations with other metals such as mercury-copper, cadmium-chromium, zinc-copper etc. These combinations of metals react with the dye to produce a product which is not identical with the mixture of the products obtained by treating portions of the dye with separate metals. The metallic combination or complex enters into the dye molecule in some manner which is different from the reaction of a single metal. The precise form of chemical combination has not yet been determined.

The ratio of the metal or metal complex to the dye may vary within wide limits and may depend on the nature of the metal and the number and nature of the metallizable groups in the dye molecule. Where more than one metal is to enter the molecule of the dye, it is, of course, necessary that there be a plurality of pairs of metallizable groups. Such cases correspond to a species under the general formula in which both R and R₂ contain hydroxyl or carboxyl groups ortho to the azo groups.

The present invention is not limited to a particular process of producing the dyes. Normally they will be prepared by coupling the dihydroxy compound with a diazo compound and a diazo azo compound. Of course, the polyazo dyes may be produced by successive couplings of diazoamino compounds which are then rediazotized and further coupled. The end components may be the same or different.

Metallization is effected in the normal manner, for example, by refluxing an aqueous solution of the dye with salts or other suitable compounds of the metals or mixed metals.

In general, the new dyes are dark colored powders which are quite soluble in water and are capable of producing valuable colors of varied tones when dyes from an acid bath on wool, silk, leather and furs. The dyes show good to excellent fastness to light, washing, fulling, acid, alkalies and sea water. The degree of fastness will vary with the particular dyes and with the metals used. Combinations of two or more of these metals also give excellent results and combinations may be made of one or more of these metals with one or more metals belonging to other groups of the periodic system.

The invention will be described in detail in the following examples but it should be understood that the invention is not limited to the details therein set forth.

Example 1

11.05 parts of picramate of soda are suspended in 50 parts of water and diazotized with 6.4 parts of hydrochloric acid (rea) and 3.66 parts of sodium nitrite keeping the temperature between 25° and 30° C. The excess of acidity is neutralized with a saturated solution of bicarbonate of soda. This diazo solution is then added to a solution containing 5.86 parts of resorcinol in 200 parts of water and 8.5 parts bicarbonate of soda. The mixture is stirred until coupling is complete and 14.5 parts of soda ash added. Then a diazo solution obtained by treating 14.7 parts of amino azo benzene sulfonic acid in 170 parts of water with 3.66 parts of nitrate and 5.6 parts of acid at 60°–63° C. is added and the mixture stirred until coupling is complete. The dye is salted out with sodium chloride after the solution is made slightly acid to Congo red. The resulting dye paste is dissolved in 800 parts of hot water and 12 parts of sodium acetate added. The solution is heated to 60° C. and a solution containing 25 parts of cadmium nitrate added. The entire mixture is then boiled for two hours and salted out with sodium chloride, filtered and dried at 65–70° C. The product is a dark brown powder, soluble in water, producing a brownish yellow color. It dyes animal fibers yellowish tones of brown of excellent fastness.

The formula of the dye prior to metallization is as follows:

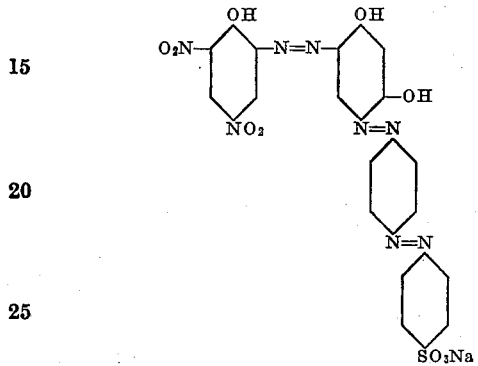

*Example 2*

160 parts of 1,5-dihydroxynaphthalene is suspended in 2500 parts of water and 400 parts of soda ash are added. The solution is cooled with ice to 5°–10° C. and then mixed with the diazo product obtained from 189 parts of 2-aminophenol-4-sulfonic acid. The mixture is stirred until coupling is complete. Then the diazo compound obtained from 307 parts of the dye produced by coupling p-aminosalicylic acid with alpha naphthylamine in acid solution is added. Then the mixture is stirred until the second coupling is complete. The reaction must be alkaline throughout the coupling. The mixture is then made acid to Congo red and the dye salted out with sodium chloride. The dye is filtered and the paste suspended in 6000 parts of water and treated with 250 parts of zinc sulfate, then the mixture is boiled for several hours. The resulting dye is then salted out with sodium chloride. It is soluble in water and dyes animal fibers black. Other metals mentioned in the specifications may be substituted for zinc and similar metallized products obtained.

The formula for the dye prior to metallization is as follows:

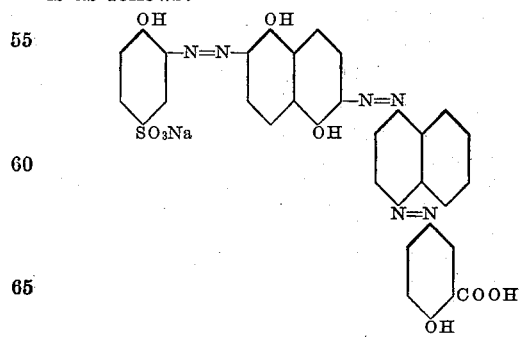

*Example 3*

One mole equivalent of the azo dye having the following formula:

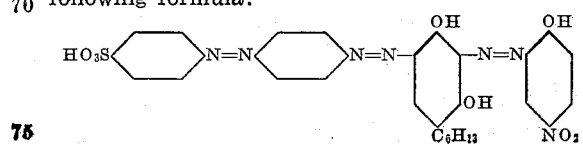

is dissolved in 4000 parts of water. This is made slightly acid to Congo red and then 300 parts of 20% sodium acetate added. It is heated to about 90° C. and one mole equivalent of mercuric nitrate added and boiled for three to four hours and is salted out using sodium chloride, made lightly acid and filtered. The dye when dry is a brown powder which dyes wool a brown hue.

*Example 4*

The procedure of Example 3 is repeated using one mole equivalent of the azo dye having the following formula:

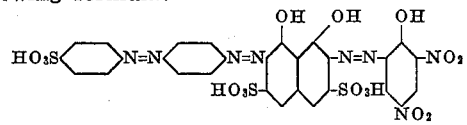

A brown dye is produced which dyes wool a reddish brown hue.

*Example 5*

The procedure of Example 3 is repeated using a mixture of one-half mole each of mercuric nitrate and copper nitrate to metallize the azo dye having the following formula:

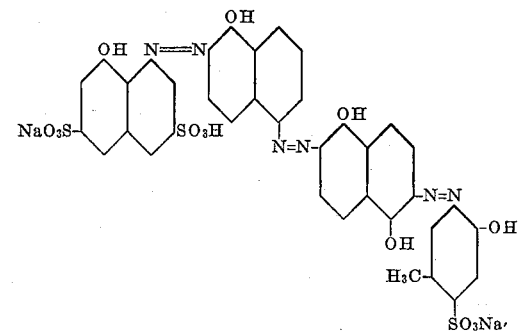

A brown dye is produced which dyes wool a brown hue.

*Example 6*

The procedure of Example 5 is repeated using a mixture of cadmium and chromium nitrate. A brown dye is produced which dyes wool a brown hue.

The metallized dye compounds described in the present application wherein the middle component is hexylresorcinol are new chemical compounds and are not claimed as a part of the present invention which is limited to dye compounds metallized with metals of the second group of the periodic table of elements.

What we claim is:

1. Metallized azo dyes having the following formula:

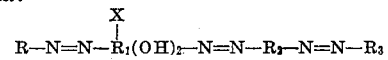

in which R, R$_1$, R$_2$ and R$_3$ are aryl radicals, the hydroxyl groups on R$_1$ are ortho to the azo groups and X represents a member of the group consisting of halogen, alkyl, alkoxy, nitro, carboxyl, sulfonic, hydroxyl and hydrogen, at least one of the radicals R and R$_2$ have a metallizable group ortho to the azo group connecting the radical to R$_1$ and at least one of the radicals R and R$_3$ has a solubilizing group, and the dye metallized with at least one of the non-alkaline salt forming metals of the second group of the periodic table of elements.

2. Metallized azo dyes, the azo dye component of which has the following formula: R—N=N—R₁(OH)₂—N=N—R₂—N=N—R₃ in which R₁ is a radical of the benzene series having the hydroxyl groups ortho to the two azo groups, R, R₂ and R₃ are aryl radicals, at least one of the radicals R and R₂ have a metallizable group ortho to the azo group connecting the radical with R₁ and at least one of the radicals R and R₃ has a solubilizing group, and the dye metallized with at least one of the non-alkaline salt forming metals of the second group of the periodic table of elements.

3. Metallized azo dyes, the azo dye component of which has the following formula:

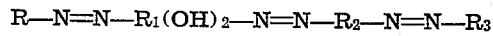

in which the radicals R, R₃ and R₂ are aryl radicals, R₁ is a naphthyl radical having the hydroxyl groups ortho to the two azo groups, at least one of the radicals R and R₂ having a metallizable group ortho to the azo group connecting the radical R₁, and at least one of the radicals R and R₃ containing a solubilizing group, and the dye metallized with at least one of the non-alkaline salt forming metals of the second group of the periodic table of elements.

4. A metallized azo dye according to claim 1 in which both R and R₂ contain metallizable groups ortho to the azo groups connecting these radicals with R₁.

5. A metallized azo dye according to claim 1 in which R₃ is an arylazoaryl radical.

6. A metallized azo dye according to claim 1 in which R₃ is an aryl radical free from azo groups except the one connecting to R₂.

7. A metallized azo dye according to claim 2 in which R is phenol with the hydroxyl group ortho to the azo group and R₂ is an azobenzene radical.

8. A metallized azo dye according to claim 2 in which R is

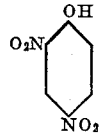

9. A metallized trisazo dye of the general formula:

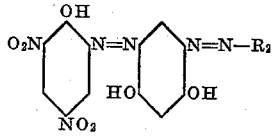

in which R₂ represents a radical of a 4′-sulfonic acid azobenzene, the dye being metallized with at least one non-alkaline salt forming metal of the second group of the periodic table of elements.

10. The complex mercury compound of the trisazo dyestuff of the formula:

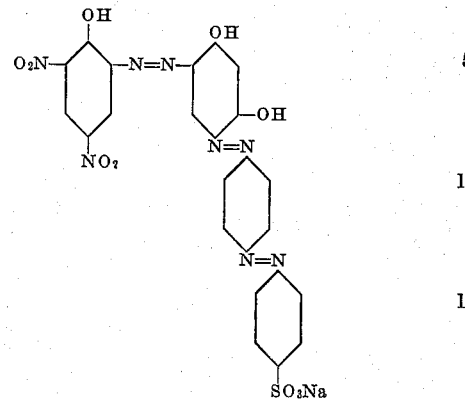

11. A metallized azo dye according to claim 1 in which both R and R₂ contain metallizable groups ortho to the azo groups connecting these radicals to R₁ and the dye metallized with a mixture of at least one of the non-alkaline salt forming metals of the second group of the periodic table of elements with at least one of the metals included in the group consisting of chromium and copper.

12. The complex copper-zinc compound of the azo dye having the following formula:

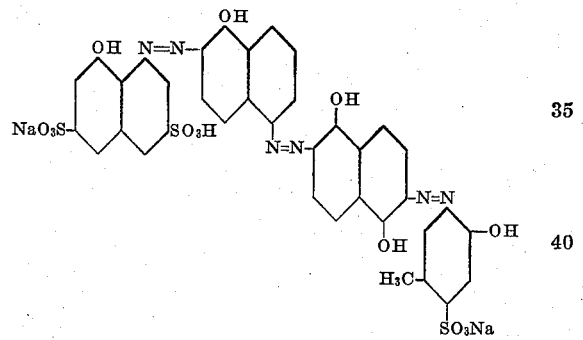

13. The complex cadmium-copper compound of the azo dye having the following formula:

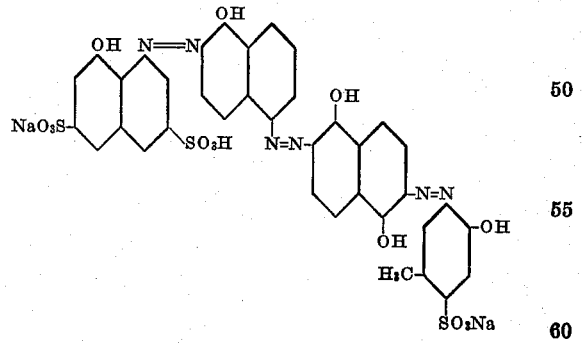

MOSES L. CROSSLEY.
LINCOLN M. SHAFER.

CERTIFICATE OF CORRECTION.

Patent No. 2,220,396.   November 5, 1940.

MOSES L. CROSSLEY, ET AL.

It is hereby certified that error appears in the printed specification of the above numbered patent requiring correction as follows: Page 2, second column, line 51, for "metallized" read --unmetallized--; and that the said Letters Patent should be read with this correction therein that the same may conform to the record of the case in the Patent Office.

Signed and sealed this 17th day of December, A. D. 1940.

(Seal)

Henry Van Arsdale,
Acting Commissioner of Patents.